(12) United States Patent
Knutson et al.

(10) Patent No.: US 9,793,931 B2
(45) Date of Patent: Oct. 17, 2017

(54) METHOD AND APPARATUS FOR DETECTING TRANSMITTERS FOR A WHITE SPACE DEVICE

(75) Inventors: Paul Gothard Knutson, Westfield, IN (US); Wen Gao, West Windsor, NJ (US); Benyuan Zhang, Cherry Hill, NJ (US); Hou-Shin Chen, San Diego, CA (US)

(73) Assignee: THOMSON Licensing, Issy-les-Moulineaux (FR)

( * ) Notice: Subject to any disclaimer, the term of this patent is extended or adjusted under 35 U.S.C. 154(b) by 0 days.

(21) Appl. No.: 13/520,382

(22) PCT Filed: Jan. 15, 2010

(86) PCT No.: PCT/US2010/000100
§ 371 (c)(1),
(2), (4) Date: Apr. 29, 2014

(87) PCT Pub. No.: WO2011/075155
PCT Pub. Date: Jun. 23, 2011

(65) Prior Publication Data
US 2015/0065185 A1    Mar. 5, 2015

Related U.S. Application Data

(60) Provisional application No. 61/286,227, filed on Dec. 14, 2009.

(51) Int. Cl.
*H04W 16/14* (2009.01)
*H04B 1/04* (2006.01)
(Continued)

(52) U.S. Cl.
CPC ......... *H04B 1/0475* (2013.01); *H04L 12/66* (2013.01); *H04N 21/43615* (2013.01); *H04N 21/43637* (2013.01); *H04W 28/048* (2013.01)

(58) Field of Classification Search
CPC combination set(s) only.
See application file for complete search history.

(56) References Cited

U.S. PATENT DOCUMENTS

| 5,970,386 A | 10/1999 | Williams |
| 2005/0063349 A1* | 3/2005 | LoGalbo ............... H04W 88/08 370/338 |

(Continued)

FOREIGN PATENT DOCUMENTS

| JP | 2002335568 | 11/2002 |
| KR | 20070010381 | 1/2005 |

(Continued)

OTHER PUBLICATIONS

Devroye et al., "Cognitive Radio Networks," IEEE Signal Processing Magazine, vol. 25, No. 6, Nov. 1, 2008, pp. 12-23.
Search Report dated Sep. 15, 2010.

*Primary Examiner* — Cindy Trandai
(74) *Attorney, Agent, or Firm* — Brian J. Dorini; Catherine A. Cooper (57) ABSTRACT

The invention relates to a wireless home gateway apparatus and methods of wirelessly delivering audio and/or video programs between a home gateway and a client and mitigating interference thereon. Specifically, the present invention relates to transmitting an audio/video program on two white space channels and alternately stopping transmission on one of said channels to search for external transmissions on the white space channel. The present invention permits the wireless home gateway to continuously transmit an audio/video program to a client while periodically searching for transmitters on each of the white space channels.

13 Claims, 6 Drawing Sheets

(51) Int. Cl.
*H04L 12/66* (2006.01)
*H04N 21/436* (2011.01)
*H04N 21/4363* (2011.01)
*H04W 28/04* (2009.01)

(56) References Cited

U.S. PATENT DOCUMENTS

| | | | | |
|---|---|---|---|---|
| 2006/0030266 A1* | 2/2006 | Desai | ............. | H04W 16/14 455/41.2 |
| 2007/0014253 A1 | 1/2007 | Lee et al. | | |
| 2009/0061783 A1* | 3/2009 | Choi | ............. | H04L 1/0004 455/68 |
| 2009/0217333 A1 | 8/2009 | Young et al. | | |
| 2010/0075704 A1* | 3/2010 | McHenry | ............. | H04W 16/14 455/509 |
| 2010/0150113 A1* | 6/2010 | Hwang | ............. | H04W 72/1226 370/336 |
| 2010/0297958 A1* | 11/2010 | Murakami | ............. | H04N 5/38 455/77 |
| 2010/0304678 A1* | 12/2010 | Chandra | ............. | H04W 16/14 455/62 |
| 2011/0021152 A1* | 1/2011 | Memik | ............. | H04W 72/02 455/62 |
| 2011/0028100 A1* | 2/2011 | Memik | ............. | H04W 16/14 455/67.11 |
| 2011/0090887 A1* | 4/2011 | Kim | ............. | H04W 16/14 370/338 |
| 2011/0158147 A1* | 6/2011 | Li | ............. | H04W 72/082 370/312 |
| 2011/0176060 A1* | 7/2011 | Lee | ............. | H04L 1/0001 348/723 |
| 2011/0306375 A1* | 12/2011 | Chandra | ............. | H04W 24/00 455/509 |

FOREIGN PATENT DOCUMENTS

WO   WO2004082282   9/2004
WO   WO2009114931   9/2009

* cited by examiner

METHOD AND APPARATUS FOR DETECTING TRANSMITTERS FOR A WHITE SPACE DEVICE

CROSS REFERENCE TO RELATED APPLICATION

This application claims the benefit, under 35 U.S.C. §365 of International Application PCT/US2010/000100, filed Jan. 15, 2010, which was published in accordance with PCT Article 21(2) on Jun. 23, 2011 in English and which claims the benefit of U.S. provisional patent application No. 61/286,227, filed Dec. 14, 2009.

FIELD OF THE INVENTION

The invention relates to a wireless home gateway apparatus and methods of wirelessly delivering audio and/or video programs between a home gateway and a client device. Specifically, the invention relates to interference mitigation by facilitating the changing of white space transmission frequencies in response to a user experience.

BACKGROUND OF THE INVENTION

The present invention generally relates to an apparatus and methods for presenting audio and video content on a plurality of display devices using a single home gateway server. The apparatus and methods also allow the user of at least one of the display devices to signal the gateway home server to change transmission frequencies in response to a user request.

This section is intended to introduce the reader to various aspects of art, which may be related to various aspects of the present invention that are described below. This discussion is believed to be helpful in providing the reader with background information to facilitate a better understanding of the various aspects of the present invention. Accordingly, it should be understood that these statements are to be read in this light, and not as admissions of prior art.

The white space spectrum comprises unused frequency bands primarily in the FM and television signal bandwidths. New government regulations have enabled the use of this unused bandwidth for use by wireless interfaces within the home. Previously, computers and set-top boxes were required to access content through hard wired transmission means, such as coaxial cable or Ethernet cable, or were restricted to transmitting on dedicated frequencies often shared by wireless networks and cordless telephones where those frequencies were outside of the FM and television bands.

Devices that take advantage of white space, called white space devices (WSD) are designed to detect the presence of existing signals, such as TV stations and other wireless users, and to then avoid the use of these channels. WSD then transmit and receive information on the unused portions of the spectrum, or the white space. Detection can include sensing signals within the spectrum, or using GPS and receivers databases of known transmitters within the area. The databases can be updated via the internet, known transmitters, or by the WSD themselves.

In operation, the WSD may search the allowable spectrum for a frequency band not in use. The WSD will then transmit the channel to be monitored to the display device or a device which controls the channel selection of the display device. The display device then tunes the channel as indicated by the WSD so that the viewer can view the information transmitted by using a standard tuner installed in the device or associated with the device.

A problem with traditional WSD operation is that new transmitters may come online after the WSD has begun transmitting on the white space channel and the WSD may then interfere with the new transmitter. A method and apparatus for detecting new transmitters would be desirable to overcome this problem.

SUMMARY OF THE INVENTION

In order to solve the problems described above, the present invention concerns an apparatus and associated methods for receiving video content and transmitting it to display devices over white space channels or unused channels within a geographic location. This and other aspects of the invention will be described in detail with reference to the accompanying Drawings.

Generally, the present invention defines an apparatus comprising a first transmitter for transmitting an audio/video program at a first frequency, a second transmitter for transmitting the audio/video program at a second frequency; and a detector for detecting an external transmitter at the first frequency and the second frequency, wherein the first transmitter stops transmitting the audio/video program during a first time period during which time the second transmitter is transmitting, wherein the second transmitter stops transmitting the audio/video program during a second time period during which time the first transmitter is transmitting; and wherein the detector attempts to detect the external transmitter during the first time period at the first frequency and during the second time period at the second frequency.

In accordance with another aspect of the invention, comprises a method comprising the steps of transmitting a audio/video program at a first frequency, transmitting the audio/video program at a second frequency, stopping transmission of the audio/video program at the first frequency, detecting an external transmission at the first frequency, resuming the transmission of the audio/video program at the first frequency, stopping transmission of the audio/video program at the second frequency, detecting the external transmission at the second frequency, and resuming the transmission of the audio/video program at the second frequency.

These and other aspects of the invention will be explained with reference to a preferred embodiment of the invention show in the accompanying drawings.

BRIEF DESCRIPTION OF THE DRAWINGS

The above-mentioned and other features and advantages of this invention, and the manner of attaining them, will become more apparent, and the invention will be better understood, by reference to the following description of embodiments of the invention taken in conjunction with the accompanying drawings, wherein.

The exemplifications set out herein illustrate preferred embodiments of the invention, and such exemplifications are not to be construed as limiting the scope of the invention in any manner.

DETAILED DESCRIPTION OF THE DRAWINGS

As described herein, the present invention provides a display server apparatus and associated methods for receiving video content and providing it to multiple display devices. Such a display server may include advanced features, including distribution of video and/or audio over unused radio frequency (RF) channels, commonly referred to as white space channels, interaction with RF and infrared (IR) remote controls, and advanced user interface applications to display content available to remote video display units.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

Figure 1:
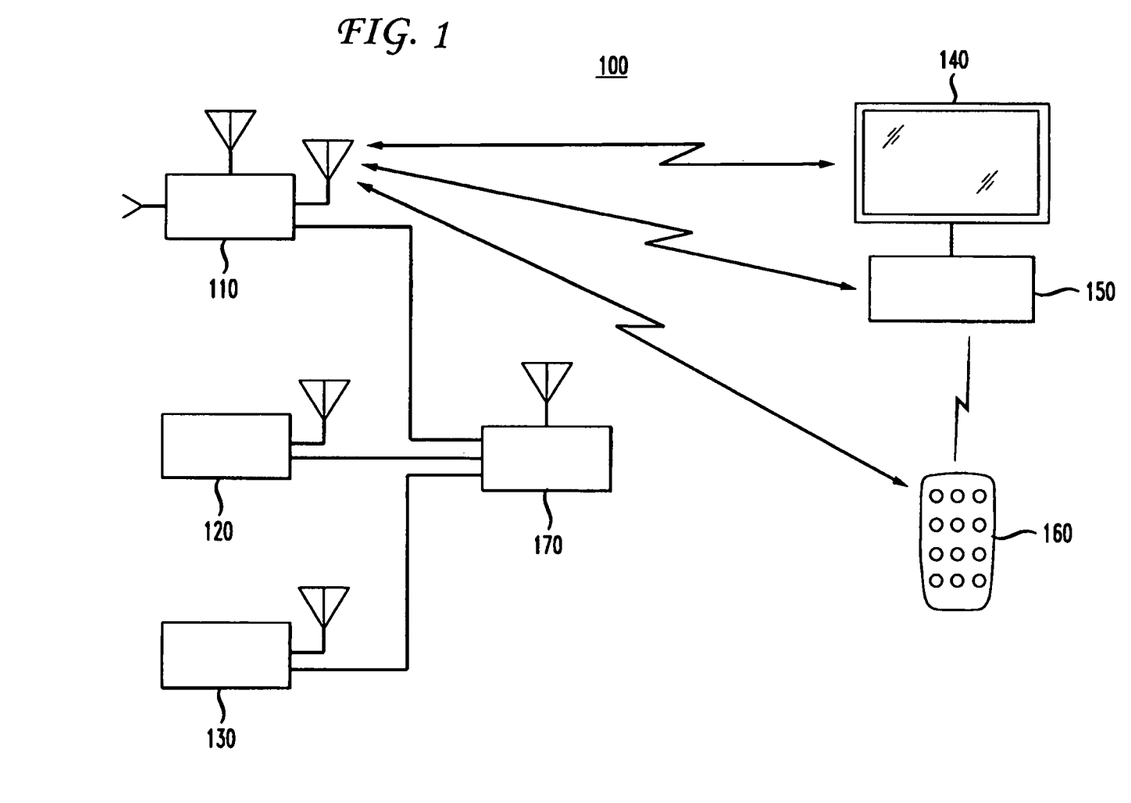
FIG. 1 is a block diagram of a white space home gateway interface system embodying aspects of the present invention.

Turning to FIG. 1, a block diagram of a white space home gateway interface system embodying aspects of the present invention is shown. The white space home gateway interface 100 system of FIG. 1 comprises a home gateway interface 110, a first personal computer 120, a second personal computer 130, a display device 140, a set top box 150, a remote control 160 and a network router 170.

The home gateway interface 110 is a device utilized to distribute audio and video programs to user devices over unused RF frequencies. The home gateway interface 110 comprises at least one terrestrial white space modulator which facilitates the broadcast of an audio or video program over the unused RF frequency. The home gateway interface 110 is operative to sense the RF spectrum and find unused RF frequencies, commonly called white space channels. The home gateway interface 110 then modulates a requested audio or video program using the terrestrial white space modulator to the unused RF frequency. The home gateway interface 110 then transmits this modulated signal via an antenna. The home gateway interface 110 is further operative to transmit data indicating the RF frequency to a receiving device or a remote control 160, such that the receiving device, such as a display device 140 or a set top box 150 with signal processing capabilities or a remote control 160, capable of controlling these devices, is operative to tune the white space channel to receive the program. Often the receiving device has no transmission capabilities, so therefore the home gateway interface must supply the all the necessary data to facilitate the use of the device.

The home gateway interface 110 can be capable of receiving audio video content through any number of methods. The home gateway interface may be able to access content such as music or video files stored on a personal computer 120, 130. The home gateway interface 110 may be operative to control the personal computer via RF transmission wherein the personal computer 120, 130 comprises an antenna capable of receiving the transmission. The home gateway interface 110 may be further operative to control the personal computer via the network router over an hardwired connection, such as Ethernet wire, or over a wireless connection, such as the IEEE 802.11 set of standards for carrying out wireless local area network (WLAN) computer communication in the 2.4, 3.6 and 5 GHz frequency bands. Content can be transmitted to the home gateway interface 110 from the personal computer 120, 130 via the same transmission paths or different transmission paths. For example, the personal computer 120, 130 may receive commands from the home gateway interface 110 via a direct RF link, and the requested content transmitted to from the personal computer 120, 130 to the home gateway interface 110 via a hardwired home network. The home gateway interface 110 may further receive content via direct connection to a cable television system, fiber optic network, satellite antenna, or via an antenna capable of receiving ATSC television broadcasts or radio signals in the FM band. The home gateway interface 110 may receive content via any manner of transmission, or the content may be stored in memory or on a hard drive on the home gateway interface itself. The manner of receiving the content is not an essential element in the operation of the present invention and the present invention will be operative in a similar manner using any method of content access.

Figure 6:
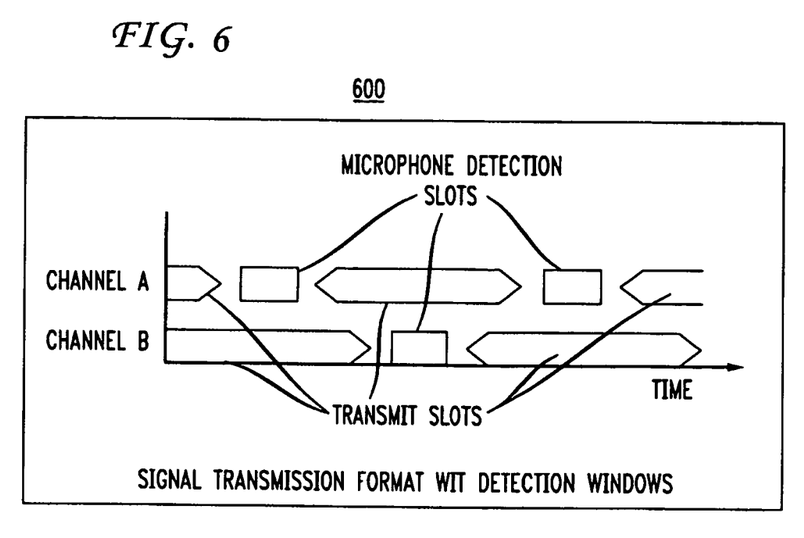
FIG. 6. depicts the parallel transmission of data over a dual frequency white space system embodying aspects of the present invention.

The whitespace channels can further be used as a high rate data transmission path to a remote system with a personal computer 130 where the personal computer 130 is either stand alone, or integrated in the display device 140 for example. This transmission path could be used to stream content wirelessly without the need for contention of the channel and the MAC overhead encountered in a WLAN. The link could be for streaming video, or data could be conveyed using the ATSC A-90 standard. The personal computer 130 could be configured with an ATSC receiver, and the home gateway interface 110 could transmit streaming data to the computer's ATSC receiver. This could also be accomplished using a cable interface using DVB-C, DVB-C2, QAM or other cable standard modulations (FIG. 6). Configuration of the computer interface is easily facilitated since there is a parallel LAN interface (Wired or wireless) to the computer through which configuration information can be conveyed.

The home gateway interface 110 may be the central point of access for all content in the home. The home network will provide access to user provided content, the ISP will provide access to internet content, subscription content and other high value content can be provided over other satellite, cable, DSL or Fiber interfaces. Menus accessible by the remote will allow the user access to the wide variety of content. Some service providers may have program guides to help with the selection of content, also accessible via the remote control.

In an exemplary embodiment, the display device 140 can be a standard ATSC television receiver, incapable of communicating with the home gateway interface 140. Thus a key component of a system according to this embodiment is the remote control 160, which becomes a simple unifying device in the system, combined with a terrestrial TV white space modulator in the home gateway interface 110, which provides the wireless path to the display device. In this configuration, the home gateway interface 110 tells the remote control 160 via an RF signal, either on the white space frequency or another dedicated RF frequency such as WiFi, ZigBee or the like which white space channel it will use to reach the television receiver in the home. The remote control 160 is further operative to send a control signal to the display device 140 or television signal receiver to enable the display device 140 or television signal receiver to tune to the correct white space channel.

The remote control 160 can be operative to control the display device 140, a set top box 150 and the home gateway interface 110. The remote control 160 can transmit these commands by RF transmission or IR control signals. The remote control 160 can be further operative to control the home gateway interface 110 to bring up the home gateway interface 110 screen on the display device and permitting a user to select from available audio video content, or permitting a user to access the Internet via the home gateway interface 110. The remote control 160 can control the display device 140 by permitting the user to control the audio volume, picture characteristics, such as brightness, contrast and the like.

The remote control 160 ties in to the home gateway with a wireless interface. Since the data rates are low from the remote to the gateway, a proprietary interface could be used to minimize power consumption in the remote. However, the remote could access the home gateway using WiFi, for a standard based implementation.

The home gateway interface 110 will need to sense the TV channels to find a white space channel to make the link to the television receiver. Alternately, location based methods can be used to identify the free channel when the gateway is in a fixed location. The home gateway interface 110 could use geographical coordinates to see which TV channels are occupied by incumbent licensed signals and which TV channels are available for white space usage.

If the user has poor reception on a given whitespace channel, the remote control 160 will provide a button to change the RF channel. This will change the physical characteristics of the multipath at the receiver, and may improve the reception from the home gateway interface 110 to the television receiver. A simple antenna could be used in the receiver, and the ability to change RF channels would benefit the link from the gateway to the television receiver.

Figure 2:
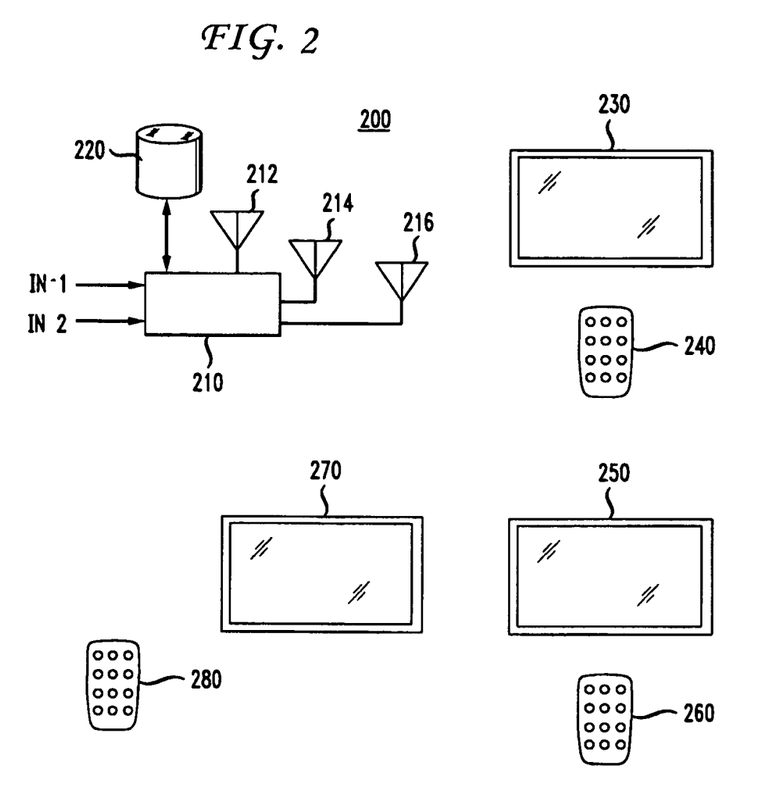
FIG. 2 is a block diagram of a white space home gateway interface system having multiple television receivers and multiple remote controls embodying aspects of the present invention.

Turning to FIG. 2, a block diagram of a white space home gateway interface system 200 having multiple television receivers and multiple remote controls embodying aspects of the present invention is shown. The system 200 shown in FIG. 2 is similar to the system of FIG. 1 modified to include more television signal receivers 230, 250, 270 and multiple remote controls 240 260, 280. The television signal receivers 230, 250, 270 could be display devices, or set top boxes capable of receiving RF signals from the home gateway device 210. A single home gateway device could support multiple television signal receivers 230, 250, 270, since there could multiple white space channels available. This size of the system of FIG. 2 would typically be limited by the number of whitespace channels the home gateway interface 210 can simultaneously support. For each television signal receiver 230, 250, 270, the home gateway interface 110 would require ability to transmit over a whitespace channel to the television receiver. This could be accomplished by plug-in modules for each receiver in the home gateway interface 210 system, or set top boxes for each display device not capable of receiving an RF signal from the home gateway interface 210. The set top box or plug in module typically would support graphics and audio requirements for one display device, however, a set top box could be configured to share some processing with multiple television interfaces. These multiple device set top boxes may comprise capabilities such as video transport stream processing, graphics rendering and video compression and encoding, agile ATSC modulator.

The home gateway interface 210 could receive content from a hard drive 220 or like memory device, an antenna 212 for receiving broadcast signals such as ATSC broadcasts or satellite signals, or through local area network connections IN1 or internet connections IN2. As with the system of FIG. 1, the gateway network interface 210 could broadcast modulated video or audio programs over one or more unused white space channels via an ATSC transmit antenna 214 to the television signal receivers and transmit data and receive commands from the remote controls 240, 260, 280 via another RF antenna 216.

Each remote control 240, 260, 280 would be associated with a single television signal receiver 230, 250, 270 since the home gateway interface 210 would need to establish a relationship between a particular remote control 240, 260, 280 and a particular television receiver 230, 250, 270 so that the programming modulated on a particular white space channel is received and decoded by the intended television receiver 230, 250, 270. For example, if one remote control 240 was paired with one television signal receiver 230, when the user wished to change programming, an RF signal is sent from the remote control 240 to the home gateway interface 210 via the RF antenna 216. The home gateway interface 210 processes the request and changes the content broadcast on the white space channel being received by the television signal receiver 230. In this example, the television signal receiver would not change the RF channel tuned, much in the same way a television signal receiver connected to a video cassette recorder could always tune channel 3 while the received broadcast is being changed via the video cassette recorder's tuner. However, if a user then moved the remote control 240 to a different television signal receiver 270 and tried to change the program being viewed on that television signal receiver 270, the home gateway interface would not know the user had moved and would subsequently change the display of the television signal receiver 230 originally paired with that particular remote control 240. This problem could be overcome by placing a device one or near each television which would send an IR or RF signal to the remote control when the remote control comes within range of the television signal receiver 270. In response to receiving this signal, the remote control 240 would update a new pairing to the home gateway interface 210 so that the home gateway interface 210 would change the programming on the correct white space channel in response to a user command. Additionally, the remote control could transmit an RF signal to receivers located at each of the television signal receiver 230, 250, 270 and use responses from the television signal receivers 230, 250, 270, or attached devices, to determine a distance from each television signal receiver 230, 250, 270. The remote control 240 could then use this information to determine which television signal receiver 230, 250, 270 is closest to the remote control 240 and therefore most likely being viewed by the user, and transmit this relationship to the home gateway interface 210 to establish the correct pairing. This same operation could be performed using an IR transmitter and receiver in the remote control 240 and the television signal receiver 230, 250, 270. This would ensure a line of site connection between the remote control 230 and the television signal receiver 230, 250, 270 to aid in establishing a correct pairing. Therefore, according to this exemplary embodiment, when a user traveled around a residence with a remote control 240 into rooms with television signal receivers 230, 250, 270 operating with the home gateway interface 210, the home gateway interface 210 and the remote control 240 would automatically establish a pairing between the television signal receiver 230, 250, 270 most likely being viewed by the user and the remote control 240 being carried by the user. This pairing could also be made in response to a button push or the like on the remote control 240 by the user when the user when a new pairing is to be made.

The remote control 240 can serve as a pointer for the gateway interface using television receivers. While not necessary, use of a pointer type function will facilitate the user interface that people have come to expect of computer systems today, such as a mouse or trackball device. This the movement of the pointer can be achieved through direction button pushes on the remote control, motion sensors within the remote which translate movement of the remote control into directional movement of the pointer. A wireless keyboard could also be used to interface the home gateway. A computer based terminal could use a remote, or any human interface device supported on the computer.

During setup of the system, the remote control 240, 260, 280 would be affiliated or paired with a display device. A method for establishing this pairing could use different whitespace channels allocated to different transmitters at the gateway, which in turn, are to be received by different television signal receivers 230, 250, 270. First, the home gateway interface 210 uses spectrum sensing and/or geo-location database to find available whitespace channels. The home gateway interface 210 assigns channels to its transmitters, and provides a unique ID number for each channel. When the user surfs through the TV channels and finds a home gateway interface 210 welcome screen, he enters a key sequence with the welcome screen ID number into the remote control 240, 260, 280. This tells the home gateway interface 210 which whitespace channel is affiliated with each remote control device 240, 260, 280. The home gateway interface 210 indicates to the remote control 240, 260, 280 that this is the channel that will be used when the home gateway interface 210 access button is pressed. The user can now access the content available from the home gateway interface 210, since the television signal receiver 230, 250, 270 has become a display wirelessly connected to the home gateway interface 210. The remote control 240, 260, 280 may have a means of selecting "gateway mode," where the remote control 240, 260, 280 will tell the television signal receiver 230, 250, 270 which channel to use received via RF interface to home gateway interface 210, and the remote control 240, 260, 280 will access content on the home gateway interface 210 via the RF interface, while keeping the television signal receiver 230, 250, 270 tuned to the correct whitespace channel. This mode control is typically accomplished as a row of device buttons showing what the remote control 240, 260, 280 will control—for example, satellite, cable, DVD, gateway, etc. Using this interface, the user can send content to multiple television signal receivers tuned to the same whitespace channel, and control all of them with the remote control 240, 260, 280. Using other modes than gateway mode, the remote control 240, 260, 280 can perform traditional remote control functions. In gateway mode, the remote control 240, 260, 280 sends RF commands back to the gateway to control the content on the affiliated whitespace channel. In gateway mode the remote control 240, 260, 280 will change TV parameters, such as brightness, contrast, volume, etc., but the channel will be changed only if directed by the home gateway interface 210. The channel change would be initiated because of an incumbent user appearing in the channel, or because the user requested a different whitespace channel because of reception difficulty.

Figure 3:
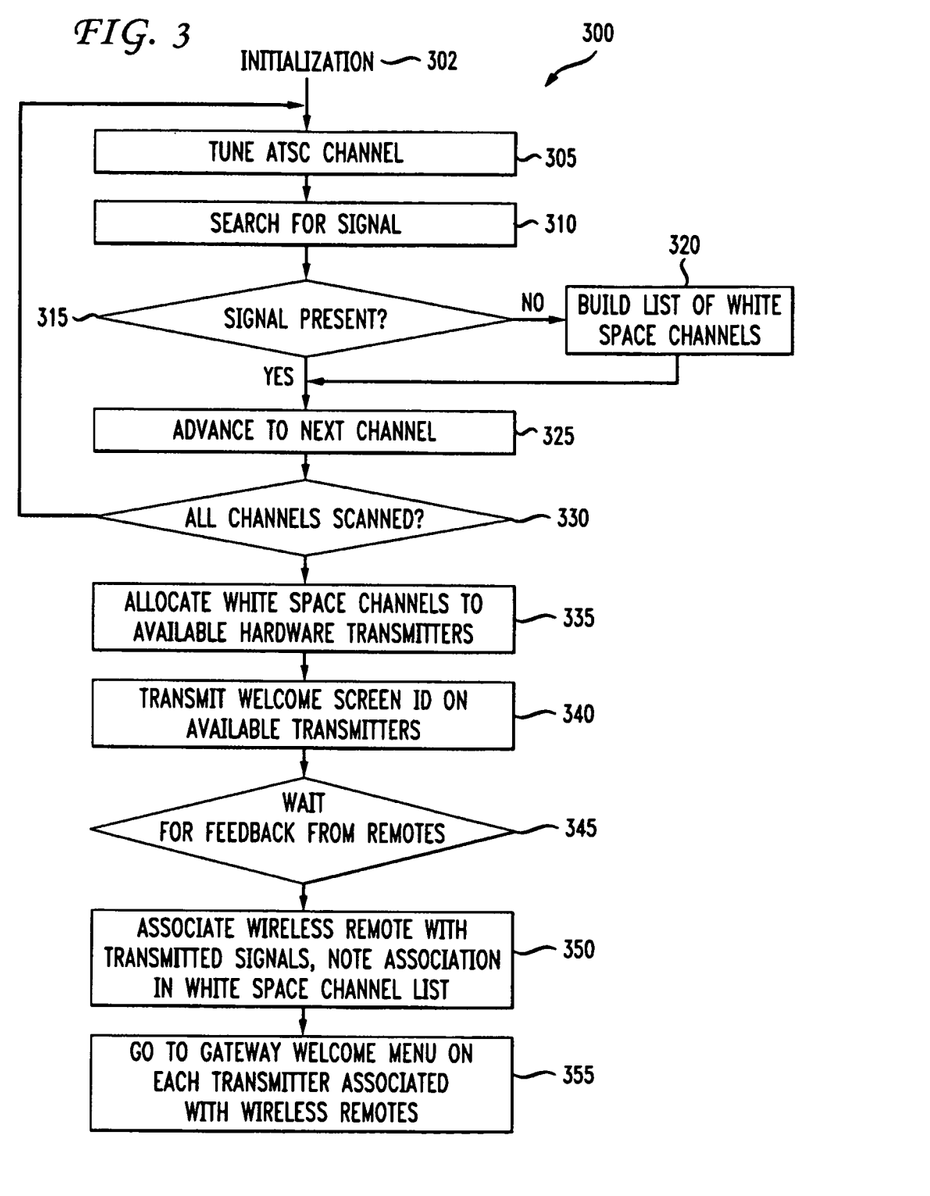
FIG. 3 is a flow chart of an exemplary method of initializing a white space home gateway interface according to the present invention.

Turning to FIG. 3, a flow chart of an exemplary method of initializing a white space home gateway interface according to the present invention is shown. The method of FIG. 3 shows the initialization sequence 300 for a home gateway interface 210 of FIG. 2 used in a ATSC broadcast environment. When power is applied to the home gateway interface, or a similar initialization event 302, the home gateway interface tunes a first ATSC channel 305. The home gateway interface searches 310 for the presence of an ATSC signal. If a signal is present 315, the home gateway interface advances to the next ATSC channel 325. If the signal is not present 315, the home gateway interface adds the ATSC channel to a list of available white space channels 320. The home gateway interface then advances to the next ATSC channel 325. The home gateway interface then determines if all channels have been scanned. If not, the home gateway interface returns to step 305 and proceeds for all of the remaining ATSC channels. If the home gateway interface determines that all of the ATSC channels have been scanned 330, the home gateway interface proceeds to allocate white space channels to available hardware transmitters 335. After the white space channels have been allocated, the home gateway interface then transmits a welcome screen ID on available transmitters 335. The home gateway interface then waits for feedback from remote controls 345. The user may then provide feedback on the transmission reception. An example of this feedback might be entering a numeric code or the like depicted on the welcome screen. The remote transmits this code to the home gateway interface along with a remote control identifier. Once feedback has been received from a remote control, the remote control identifier is associated with the white space channels having that numeric code depicted on the welcome screen and the associated is stored in the white space channel list 350. Once a remote control is associated with the white space channel, the home gateway interface starts normal operation by transmitting a gateway welcome menu on each transmitter associated with a remote 355.

Figure 4:
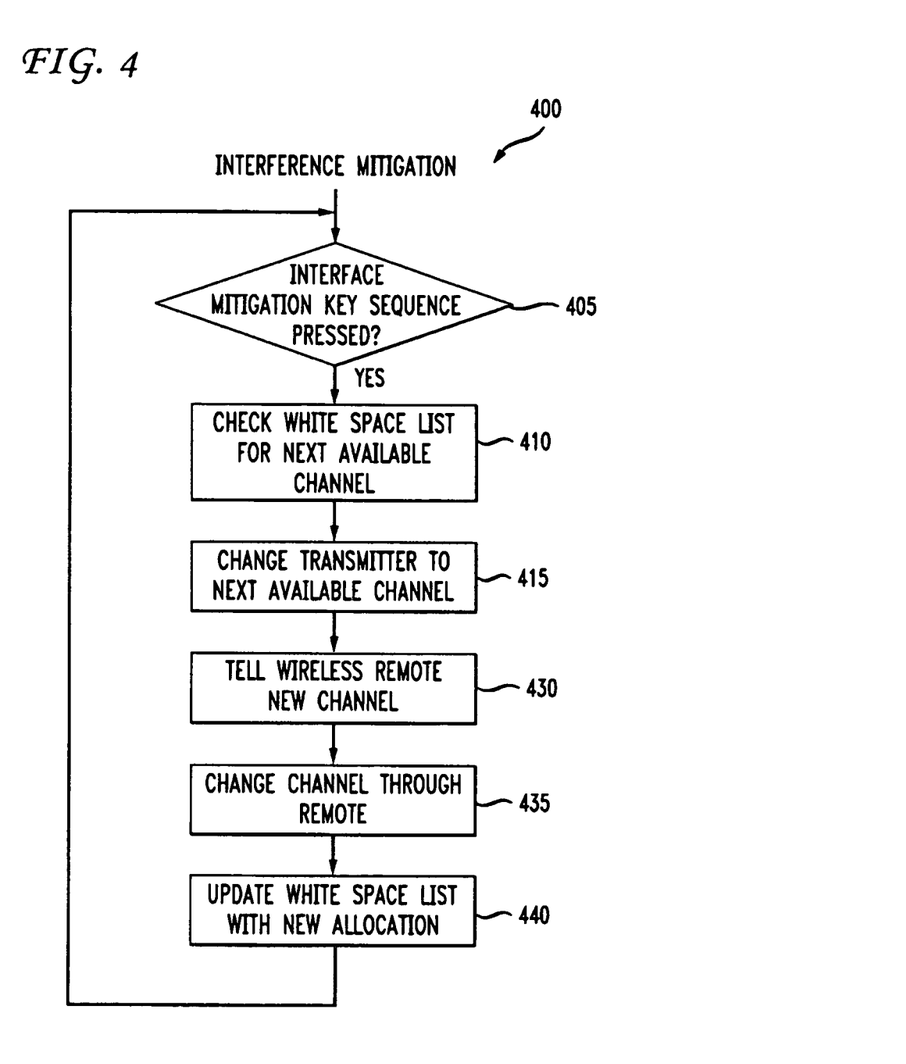
FIG. 4 is a flow chart of an exemplary method of mitigating interference in a home gateway interface according to the present invention.

Turning to FIG. 4, a flow chart of an exemplary method of mitigating interference in a home gateway interface according to the present invention is shown. The method of FIG. 4 shows an interference mitigation routine 400 for the home gateway system of FIG. 2. In the event of interference issues on a given whitespace channel, the user can trigger a frequency change by pressing a key sequence to enable a whitespace channel change. Since the gateway has access to the remote and the transmitter, it can change frequencies at the suggestion of the user, or automatically if interference is detected.

The home gateway interface monitors for transmissions from the remote control. When a code indicating that the interference mitigation key has been pressed 405, the home gateway interface checks the white space list for the next available white space channel 410. The home gateway interface then changes the transmit frequency of the RF transmitter 415 to that of the next available white space channel. The home gateway interface then transmits data indicating the new white space channel to the remote control 430. The remote control then changes the channel of the television signal receiver 435 locally in response to receiving this data. The home gateway interface then updates the white space list with the new allocation 440. The home gateway interface then returns to monitoring for data from the remote controls.

Figure 5:
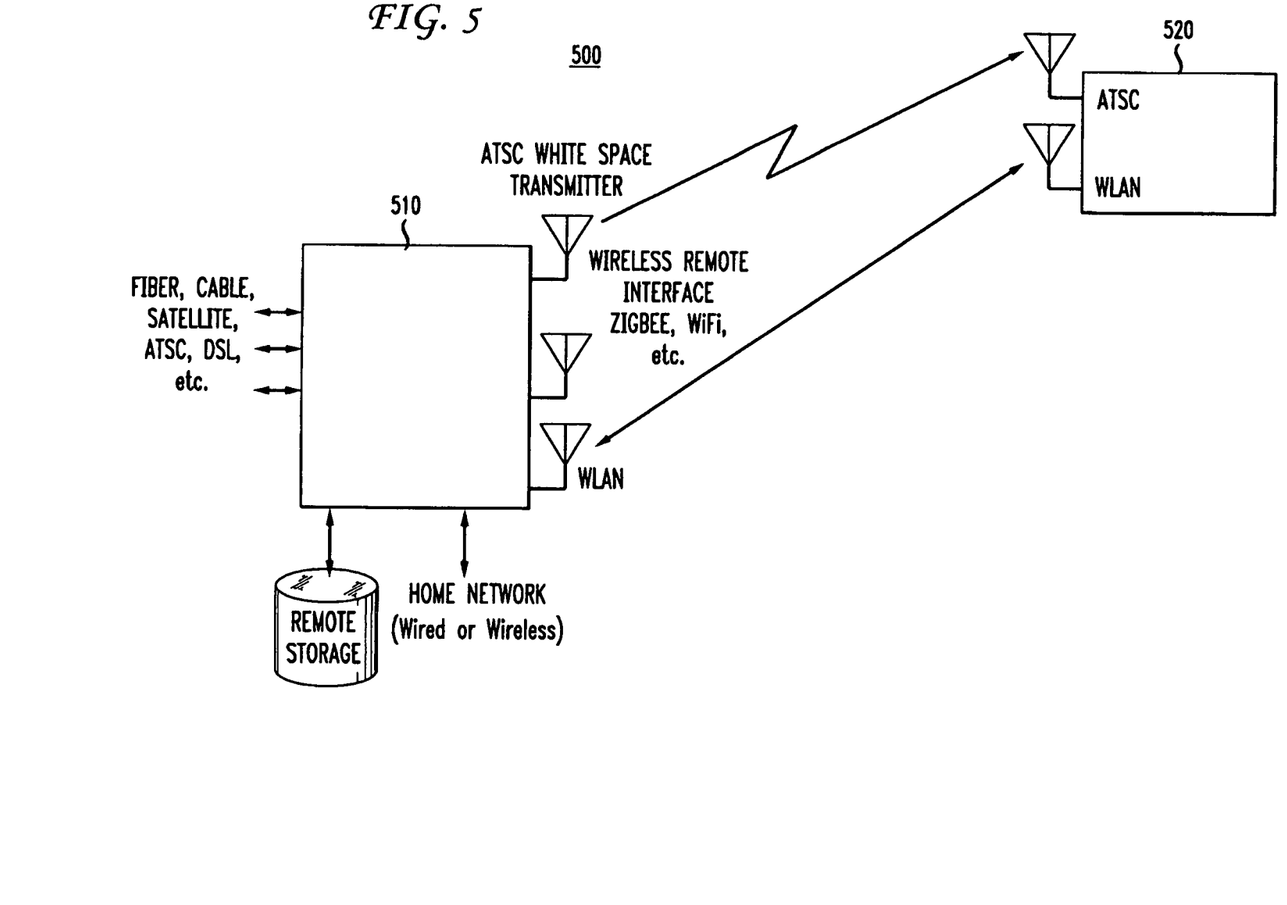
FIG. 5 is a block diagram of a dual frequency white space system embodying aspects of the present invention.

Turning to FIG. 5, a block diagram of a dual frequency white space system embodying aspects of the present invention is shown. The system of FIG. 5 illustrates a system 500 with parallel interrupted transmissions to permit quiet times for microphone detection. An issue that may influence the design of the home gateway interface is that wireless microphone detection may need to be performed frequently, on the order of every few seconds. This could be a challenge for the continuous single channel links suggested in the previous examples, since the transmitter must be silenced to detect signals 20 dB below the noise floor. To address this problem, a dual transmitter home gateway interface and a dual-tuner receiver can ping-pong between two white space channels, permitting a dedicated streaming channel to be realized across two ATSC channels. Microphone sensing can occur while the alternating channel is not transmitting. This would enable robust high quality of service streaming delivery to a receiver designed to handle the ping-pong transmission.

The home gateway interface 510 utilizing the parallel transmission method would transmit the requested signal on two available white space channels. Each of the channels would have periodic outages at different times to attempt to detect new transmitters in that frequency, such as wireless microphones. The home gateway interface could receive commands and data from the alternating channel receiver 520 via local area network, either hardwired or wireless, or through a remote control.

The alternating channel receiver 520 comprises two tuners, each of which are tuned to one of the white space channels being transmitted on by the home gateway interface. Each tuner may be coupled with its own demodulator such that each channel is demodulated and a processor within the television receiver can easily switch between signals in the event of a periodic outage for detecting new transmitters. Alternately, the system may be equipped with a single demodulator and a multiplexer for switching the outputs of the tuners to the input of the demodulator during overlap periods when both channels are transmitting.

In another exemplary embodiment, only single tuner is required at the alternating channel receiver 520. The transmitter at the home gateway interface 510 periodically switches to different whitespace channels, or ping-pongs between two whitespace channels, to allow the home gateway interface 510 to sense the wireless microphone in the previous operating channel. The home gateway interface 510 informs the alternating channel receiver 520 of the channel change either through the current white space channel or through a second RF link such as WLAN. If the transmitter is streaming audio/video contents using the whitespace channels, there may be transmission interruption during the channel change. The second RF link can be used to send additional data to compensate the transmission interruption such that the streaming quality is maintained. Alternately, signal buffering can be used to compensate for the transmission interruption.

The second two-way RF link, such as WLAN, at the alternating channel receiver 520 can also be used to provide reliable data delivery: data or data file are delivered through ATSC transmitters (or DVB T/H, QAM transmitters) using white space channels. Due to the broadcast nature of the transmission and lack of acknowledgement of reception error in the ATSC transmission, the reliable data delivery cannot be ensured. The second RF link can be used to provide the or positive or negative acknowledgment of the data reception such that those data with reception error can be re-transmitted in ATSC transmission or transmitted in the second RF link if it has sufficient capacity. In another embodiment, the FEC coded data of those data with reception error can be transmitted in ATSC transmission or the second RF link to allow the recover the data in error.

Turning to FIG. 6, the parallel transmission of data 600 over a dual frequency white space system embodying aspects of the present invention is shown. Channel A indicates the transmission of data over time with periodic outages for microphone detection slots as shown. Channel B indicates a similar transmission of data over time at a different frequency with microphone detection slots staggered in time with the microphone detection slots of Channel a. The overlap of transmit slots between Channel A and channel B can used to alternate which channel is processed with minimal signal loss and by implementing the previously described methods.

While the present invention has been described in terms of a specific embodiment, it will be appreciated that modifications may be made which will fall within the scope of the invention. For example, various processing steps may be implemented separately or combined, and may be implemented in general purpose or dedicated data processing hardware.

The invention claimed is:

1. An apparatus comprising:
a first transmitter configured to transmit an audio/video program at a first frequency;
a second transmitter configured to transmit said audio/video program at a second frequency;
a detector configured to detect external transmission, by a transmitter external to the apparatus, at said first frequency and said second frequency; and
wherein said detector is operative to detect said external transmission during a first time period at said first frequency when said first transmitter stops transmitting said audio/video program and said second transmitter is transmitting said audio/video program at said second frequency, and to detect said external transmission during a second time period at said second frequency when said second transmitter stops transmitting said audio/video program and said first transmitter is transmitting said audio/video program at said first frequency, wherein said first frequency and said second frequency are white space channels, further wherein said first time period and said second time period occur at different times, and further wherein transmission over said first frequency and transmission over said second frequency provide parallel uninterrupted transmission of said audio/video program.

2. The apparatus of claim 1 wherein said external transmitter is a wireless microphone.

3. The apparatus of claim 1 wherein said first frequency and said second frequency are white space channels.

4. The apparatus of claim 3 wherein said detector detects said white space channels before attempting to detect said external transmitter.

5. The apparatus of claim 1 wherein said first time period and said second time period do not overlap in time.

6. The apparatus of claim 1 wherein said first transmitter and said second transmitter stop transmitting periodically.

7. The apparatus of claim 1 wherein a single baseband signal is constructed from the audio/video program transmitted at said first frequency and the audio/video program transmitted at said second frequency.

8. A method performed by an apparatus comprising:
transmitting, by a first transmitter, an audio/video program at a first frequency;
transmitting, by a second transmitter, said audio/video program at a second frequency;
detecting, by a detector, an external transmission by a transmitter external to the apparatus, at said first frequency and at said second frequency; and
wherein said detecting attempts to detect said external transmission during a first time period at said first frequency when said first transmitter stops transmitting said audio/video program and said second transmitter is transmitting said audio/video program at said second frequency, and to detect said external transmission during a second time period at said second frequency when said second transmitter stops transmitting said audio/video program and said first transmitter is transmitting said audio/video program at said first frequency, wherein said first frequency and said second frequency are white space channels, further wherein said first time period and said second time period occur at different times, and further wherein transmission over said first frequency and transmission over said second frequency provide parallel uninterrupted transmission of said audio/video program.

9. The method of claim 8 wherein said external transmitter is a wireless microphone transmitting at one of said first frequency and said second frequency.

10. The method of claim 8 further comprising detecting said first white space channel and said second white space channel before attempting to detect said external transmitter.

11. The method of claim 8 wherein said transmitting at said first frequency and stopping said transmitting at said first frequency by said first transmitter are performed periodically.

12. The method of claim 8 wherein said-transmitting at said second frequency and stopping said transmitting at said second frequency by said second transmitter are performed periodically.

13. The method of claim 8 wherein a single baseband signal is constructed from the audio/video program transmitted at said first frequency and the audio/video program transmitted at said second frequency.

* * * * *